United States Patent Office 3,641,143
Patented Feb. 8, 1972

3,641,143
N-CARBAMOYL-O-ALKENOYL-N-PHENYL-HYDROXYL-AMINES AS HERBICIDES
Sidney B. Richter, Chicago, and John Krenzer, Oak Park, Ill., assignors to Velsicol Chemical Corporation, Chicago, Ill.
No Drawing. Filed Aug. 15, 1968, Ser. No. 752,796
Int. Cl. C07c *127/22;* A01n *9/20*
U.S. Cl. 260—545 R      6 Claims

ABSTRACT OF THE DISCLOSURE

This invention discloses new chemical compounds of the formula

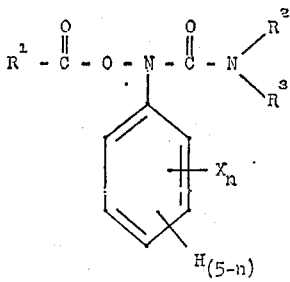

wherein $R^1$ is alkenyl; $R^2$ and $R^3$ are independently selected from the group consisting of hydrogen and alkyl; X is selected from the group consisting of alkyl, alkenyl, halogen, haloalkyl, alkoxy, nitro and dialkylamino; and n is an integer from 0 to 5. This invention further discloses new herbicidal compositions comprising an inert carrier and, as an essential active ingredient, in a quantity toxic to weeds, a compound of the above description.

---

This invention relates to new compositions of matter and more particularly to new chemical compounds of the formula

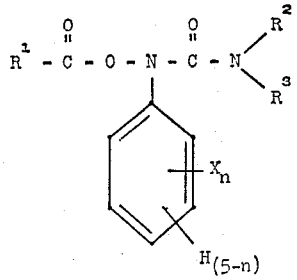

(I)

wherein $R^1$ is alkenyl; $R^2$ and $R^3$ are independently selected from the group consisting of hydrogen and alkyl; X is selected from the group consisting of alkyl, alkenyl, halogen, haloalkyl, alkoxy, nitro and dialkylamino; and n is an integer from 0 to 5.

In a preferred embodiment of this invention the substituent $R^1$ is an alkenyl group of from 2 to 10 carbon atoms; $R^2$ and $R^3$ are independently selected from the group consisting of hydrogen and lower alkyl; X is selected from the group consisting of lower alkyl, lower alkenyl, chlorine, bromine, lower haloalkyl, lower alkoxy, nitro and di(lower alkyl)amino; and n is an integer from 0 to 3.

The compounds of the present invention are unexpectedly useful as pesticides and particularly as herbicides.

The new compounds of the present invention can be prepared readily by reacting a hydroxyurea of the formula

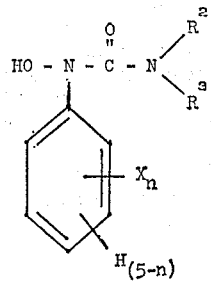

wherein $R^2$, $R^3$, X and n are as heretofore described, with an unsaturated aliphatic acid halide of the general formula

(III)

wherein Hal designates halogen and $R^1$ is as hereinabove described. This reaction can be conveniently carried out in an inert organic reaction medium, such as ether, by adding an equimolar or slight excess molar amount of the acid halide to the hydroxyurea in the presence of an acid scavenger, such as a tertiary amine or an alkali metal hydroxide or carbonate. Mild reaction conditions can be employed to effect this reaction and temperatures of from about 0 to about 60° C. and preferably temperatures of from 20 to about 40° C. can be employed. The reaction mixture can then be stirred for a period from about ½ to about 4 hours to insure the completion of the reaction. Thereafter the desired product can be recovered by first filtering the reaction mixture to remove the acid acceptor halide salt and thereafter evaporating the solvent used. The product can then be used as such or can be further purified by washing, recrystallizing, trituration, distillation, and the like.

Examplary suitable hydroxyureas for the purpose of preparing the compounds of this invention are:

1-hydroxy-1-phenylurea,
1-hydroxy-1-phenyl-2-methylurea,
1-hydroxy-1-phenyl-3,3-dimethylurea,
1-hydroxy-1-(2'-methylphenyl)-3-methylurea,
1-hydroxy-1-(3'-chlorophenyl)-3-methylurea,
1-hydroxy-1-(3',4'-dichlorophenyl)-3-methylurea,
1-hydroxy-1-(4'-bromophenyl)-3,3-dimethylurea,
1-hydroxy-1-(4'-allylphenyl)-3-ethylurea,
1-hydroxy-1-(2'-methoxyphenyl)-3-isopropylurea,
1-hydroxy-1-(3'-nitrophenyl)-3-methylurea,
1-hydroxy-1-(2'-dimethylaminophenyl)-3-methylurea,
1-hydroxy-1-(2'-methyl-4'-chlorophenyl)-3,3-dimethylurea,
1-hydroxy-1-(3',4',5'-trichlorophenyl)-3-methylurea,
1-hydroxy-1-(4'-chlorophenyl)-3-methyl-3-t-butylurea, and the like.

Exemplary suitable acid chlorides for preparing the compounds of the present invention are: acryloyl chloride, methacryloyl chloride, crotonoyl chloride, 3-butenoyl chloride, 2-pentenoyl chloride, 3-pentenoyl chloride, 4-pentenoyl chloride, 2-hexenoyl chloride, 4-hexenoyl chloride, 5-hexenoyl chloride, 2-methyl-2-pentenoyl chloride, 3-methyl-2-pentenoyl chloride, 4-methyl-3-pentenoyl chloride, 2-octenoyl chloride, 2-decenoyl chloride, and the like.

The manner in which the compounds of the present invention can be prepared readily is illustrated in the following examples.

EXAMPLE 1

Preparation of 1-methacrylyloxy-1-(3',4'-dichlorophenyl)-3-methylurea 1-hydroxy - 1 - (3',4'-dichlorophenyl)-3-methylurea (7 grams; 0.03 mol), methacryloyl chloride (3.1 grams; 0.03 mol), triethylamine (4.4 ml.) and ether (400 ml.) were charged into a glass reaction vessel equipped with a mechanical stirrer. The reaction mixture was stirred at room temperature for a period of about 4 hours. After this time the reaction mixture was filtered to remove the amine hydrochloride which had formed. The filtrate was stripped of solvent and the residue was recrystallized from a chloroform-pentane mixture to yield 1-methacryloyloxy-1-(3',4'-dichlorophenyl)-3-methylurea having a melting point of 75 to 76° C.

EXAMPLE 2

Preparation of 1-acryloyloxy-1-(2'-methylphenyl)-3-methylurea

1 - hydroxy-1-(2',-methylphenyl) - 3 - methylurea (18 grams; 0.1 mol), acryloyl chloride (9 grams; 0.1 mol), triethylamine (15 ml.) and ether (400 ml.) are charged into a glass reaction vessel equipped with mechanical stirrer. The reaction mixture is then stirred for a period of about 4 hours. After this time the mixture is filtered to remove the amine hydrochloride and is stripped of ether to yield a residue. The residue is then washed and recrystallized to yield 1-acryloyloxy-1-(2'-methylphenyl)-3-methylurea.

EXAMPLE 3

Preparation of 1-crotonoyloxy-1-(3'-allylphenyl)-3,3-dimethylurea

1 - hydroxy-1-(3'-allylphenyl) - 3,3 - dimethylurea (11 grams; 0.05 mol), crotonoyl chloride (5.2 grams; 0.05 mol), triethylamine (8 ml.) and ether (500 ml.) are charged into a glass reaction vessel equipped with a mechanical stirrer. The reaction mixture is then stirred at room temperature for a period of about 6 hours. After this time the mixture is filtered to remove the triethylamine hydrochloride and is stripped of ether, resulting in a residue. The residue is washed and recrystallized to yield 1-crotonoyloxy-1-(3'-allylphenyl)-3,3-dimethylurea.

EXAMPLE 4

Preparation of 1-(3-butenoyloxy)-1-(4'-bromophenyl)urea 1-hydroxy-1-(4'-bromophenyl)urea (11.6 grams; 0.05 mol), 3-butenoyl chloride (5.2 grams; 0.05 mol), triethylamine (8 ml.) and ether (300 ml.) are charged into a glass reaction vessel equipped with a mechanical stirrer. The reaction mixture is then stirred at room temperature for a period of about 4 hours. After this time the mixture is filtered to remove the triethylamine hydrochloride and is stripped of solvent to yield 1-(3-butenoyloxy)-1-(4'-bromophenyl)urea.

EXAMPLE 5

Preparation of 1-(2-pentenoyloxy)-1-(4'-nitrophenyl)-3-isopropylurea 1-hydroxy-1-(4'-nitrophenyl)-3-isopropylurea (12 grams 0.05 mol), 2-pentenoyl chloride (5.9 grams; 0.05 mol), triethylamine (10 ml.) and ether (400 ml.) are charged into a glass reaction vessel equipped with a mechanical stirrer. The reaction mixture is then heated at about 50° C. for a period of about 2 hours. After this time the reaction mixture is cooled to room tempearture and is filtered to remove the triethylamine hydrochloride which has formed. The filtrate is then stripped of solvent to yield 1-(2-pentenoyloxy)-1-(4'-nitrophenyl)-3-isopropylurea as the residue.

EXAMPLE 6

Preparation of 1-(4-hexenyloxy)-1-(3'-dimethylaminophenyl)-3-n-pentylurea 1-hydroxy-(3'-dimethylaminophenyl)-3 - n - pentylurea (13.3 grams; 0.05 mol), 4-hexenoyl chloride (6.6 grams; 0.05 mol), triethylamine (8 ml.) and ether (400 ml.) are placed into a glass reaction vessel equipped with a mechanical stirrer. The reaction mixture is then stirred at room temperature for a period of about 4 hours. After this time the mixture is filtered to remove the triethylamine hydrochloride and is stripped of solvent to yield a residue. The residue is washed and recrystallized to yield the desired product 1-(4-hexenoyloxy) - 1 - (3'-dimethylaminophenyl)-3-n-pentylurea.

EXAMPLE 7

Preparation of 1-(5-heptenoyloxy-1-(2'-methoxy-4'-chlorophenyl)-3-n-octylurea 1-hydroxy-1-(2'-methoxy-4'-chlorophenyl)-3 - n - octylurea (16.5 grams; 0.05 mol), 5-heptenoyl chloride (7.3 grams; 0.05 mol), triethylamine (8 ml.) and ether (350 ml.) are charged into a glass reaction vessel equipped with mechanical stirrer. The reaction mixture is then stirred at room temperature for a period of about 5 hours. After this time the mixture is filtered to remove the triethylamine hydrochloride and is stripped of ether to yield the desired product 1-(5-heptenoyloxy(-1-(2'-methoxy-4'-chlorophenyl-3-n-octylurea as a residue.

EXAMPLE 8

Preparation of 1-(3-octenoyloxy)-1-(4'-trifluoromethylphenyl)-3-n-decylurea

1 - hydroxy - 1-(4'-trifluoromethylphenyl)-3-n-decylurea (18.5 grams; 0.05 mol), 3-octenoyl chloride (8 grams; 0.05 mol), triethylamine (8 ml.) and ether (300 ml.) are charged into a glass reaction vessel equipped with a mechanical stirrer. The reaction mixture is then stirred at a temperature of about 40° C. for a period of about 3 hours. After this time the reaction mixture is cooled to room temperature and is filtered to remove the triethylamine hydrochloride. The filtrate is then stripped of ether to yield the desired product 1-(3-octenoyloxy)-1-(4'-trifluoromethylphenyl)-3-n-decylurea as a residue.

EXAMPLE 9

Preparation of 1-(2-decenoyloxy)-1-(3'-methyl-4'-chlorophenyl)-3,3-diethylurea

1 - hydroxy-1-(3'-methyl-4'-chlorophenyl)-3,3-diethylurea (11.5 grams; 0.05 mol), 2-decenoyl chloride (8.7 grams; 0.05 mol), triethylamine (8 ml.) and toluene (300 ml.) are charged into a glass reaction vessel equipped with a mechanical stirrer. The reaction mixture is then stirred at room temperature for a period of about 6 hours. After this time the mixture is filtered to remove the amine hydrochloride and is stripped of solvent to yield the desired product 1 - (2-decenoyloxy)-1-(3'-methyl-4'-chlorophenyl)-3,3-diethylurea as a residue.

EXAMPLE 10

Preparation of 1-methacryloyloxy-1-(2'-methyl-4'-bromophenyl)-3-methylurea

1 - hydroxy - 1-(2'-methyl-4'-bromophenyl)-3-methylurea (13.5 grams; 0.05 mol), methacryloyl chloride (3.1 grams: 0.05 mol), triethylamine (8 ml.) and ether (300 ml.) are charged into a glass reaction vessel equipped with a mechanical stirrer. The reaction mixture is then stirred at room temperature for a period of about 4 hours. After this time the mixture is filtered to remove the triethylamine hydrochloride which has formed. The filtrate is then stripped of solvent to yield the desired product 1 - methacryloyloxy-1-(2'-methyl-4'-bromophenyl)-3-methylurea as a residue.

Other compounds within the scope of this invention can be prepared by the procedures described in the foregoing examples.

Presented in the following examples are the essential ingredients required to prepare the indicated named compound according to the procedures heretofore described.

EXAMPLE 11

1 - hydroxy - 1 - (2',4',5'-trichlorophenyl)-3-methylurea+methacryloyl chloride+triethylamine=1 - methacryloyloxy - 1 - (2',4',5' - trichlorophenyl) - 3 - methylurea (M.P. 144–150° C.).

EXAMPLE 12

1 - hydroxy - 1-(3'-chlorophenyl)-3-methylurea+methacryloyl chloride+triethylamine=1 - methacryloyloxy-1-(3'-chlorophenyl)-3-methylurea (M.P. 72–73° C.).

EXAMPLE 13

1 - hydroxy - 1 - (3',4' - dichlorophenyl)-3-methylurea+acryloyl chloride+triethylamine=1 - acryloyloxy-1 - (3',4' - dichlorophenyl) - 3 - methylurea (M.P. 58–59° C.).

EXAMPLE 14

1 - hydroxy - 1 - (3' - chlorophenyl)-3,3-dimethylurea+acryloyl chloride+triethylamine=1-acryloyloxy-1-(3' - chlorophenyl)-3,3-dimethylurea ($n_D^{25}$ 1.5385).

EXAMPLE 15

1 - hydroxy - (3'-chlorophenyl)-3-methylurea+acryloyl chloride+triethylamine=1-acryloyloxy-1-(3'-chlorophenyl)-3-methylurea (M.P. 66–67° C.).

EXAMPLE 16

1 - hydroxy - (2',4',5' - trichlorophenyl) - 3-methylurea+acryloyl chloride+triethylamine=1-acryloyloxy-1-(2',4',5'-trichlorophenyl)-3-methylurea.

EXAMPLE 17

1 - hydroxy - 1 - phenyl - 3 - methylurea+methacryloyl chloride+triethylamine=1 - methacryloyloxy - 1 - phenyl-3-methylurea.

EXAMPLE 18

1 - hydroxy - 1 - phenyl-3,3-dimethylurea+methacryloyl chloride+triethylamine=1 - methacryloyloxy - 1-phenyl-3,3-dimethylurea.

EXAMPLE 19

1 - hydroxy - (4' - iodophenyl) - 3,3 - di-n-propylurea+acryloyl chloride+triethylamine=1 - acryloyloxy-1-(4'-iodophenyl)-3,3-di-n-propylurea.

EXAMPLE 20

1 - hydroxy - 1 - (3',4' - difluorophenyl)-3-methylurea+methacryloyl chloride+triethylamine=1 - methacryloyloxy-1-(3',4'-difluorophenyl)-3-methylurea.

EXAMPLE 21

1 - hydroxy - 1 - (2' - n-propyl-4'-ethoxyphenyl)-3-methylurea+crotonoyl chloride+triethylamine=1 - crotonoyloxy - 1 - (2'-n-propyl-4'-ethoxyphenyl)-3-methylurea.

EXAMPLE 22

1 - hydroxy - 1 - (2',6'-di-n-propoxyphenyl)-3-methylurea+acryloyl chloride+triethylamine=1-acryloyloxy-1-(2',6'-di-n-propoxyphenyl)-3-methylurea.

EXAMPLE 23

1 - hydroxy - 1-(2'-chloromethyl-4'-di-n-propylaminophenyl) - 3 - methylurea+acryloyl chloride+triethylamine=1 - acryloyloxy - 1 - (2' - chloromethyl-4'-di-n-propylaminophenyl)-3-methylurea.

EXAMPLE 24

1 - hydroxy - 1 - (2' - pentyloxy-4',5'-dichlorophenyl)-3 - methylurea+methacryloyl chloride+triethylamine=1-methacryloyloxy - (2' - pentyloxy-4',5-dichlorophenyl)-3 - methylurea.

EXAMPLE 25

1 - hydroxy - 1 - (3' - hexyl - 4',5',6' - trichlorophenyl)-3-methylurea+methacryloyl chloride+triethylamine=1-methacryloyloxy - 1 - (3' - hexyl - 4',5',6' - trichlorophenyl) - 3 - methylurea.

Additional compounds of the present invention which can be prepared by the methods of the foregoing examples are:

1-crotonoyloxy-1-(3'-di-n-pentylaminophenyl)-3,3-diethylurea
1-(3-butenoyloxy)-1-(4'-hexoxyphenyl)-3-methylurea
1-acryloyloxy-1-(4'-decycloxyphenyl)-3-ethylurea
1-methacryloyloxy-1-(3',5'-di-n-octylphenyl)-3-methylurea
1-crotonoyloxy-1-(2',6'-dibromo-4'-pentenylphenyl)-3-n-propylurea
1-(2-hexenoyloxy)-1-(4'-di-n-decylaminophenyl)-3-methylurea
1-methacryloyloxy-1-(2',4'-dinitro-5'-decenylphenyl)-3-methylurea
1-crotonoyloxy-1-(4'-γ-chloropropylphenyl)-3-methylurea
1-acryloyloxy-1-(4'-δ,δ,δ-trichlorobutylphenyl)-3-methylurea For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 26

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5% to about 95% of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separated compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silver and the like; carbamate herbicides such as IPC CIPC,, swep, barban, BCPC, CEPC, CPPC, and the like; thiocarbamate and dithiocarbamate herbicides such as CDEC, methan sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2 - chloro - N-isopropylacetanilide, 4-(chloroacetyl)morpholine, 1-(chloroacetyl)piperidine and the like; chlorinted aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2 - methoxy - 3,6-dichlorophenylacetic acid, 3 - methoxy - 2,6 - dichlorophenylacetic acid, 2 - methoxy - 3,5,6 - trichlorophenylacetic acid, 2,4-dichloro-3-nitrobenzoic acid, and the like; and such compounds as aminotriazole, maleic hydrazide, phenyl mercuric acetate, endothal, biuret, technical chlordane, dimethyl 2,3,5,6 - tetrachloroterephthalate, diquat, erbon, DNC, DNBP, dichlobenil, DPA, diphenamid, dipropalin, trifluralin, solan, dicryl, merphos, DMPA, O - S - dimethyl tetrachlorothioterephthalate, methyl 2,3,5,6 - tetrachloro-N-methoxy-N-methylterephthalamate, 2 - [(4 - chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegress, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattain and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the post-emergence control of a variety of common weeds. In these experiments the compound 1-methacryloyloxy-1-(3',4'-dichlorophenyl)-3-methylurea was formulated as an aqueous emulsion and was sprayed at the indicated dosage on the foliage of the various weeds that had attained a prescribed size. After spraying, the plants were placed in a greenhouse and watered daily or more frequently. Water was not applied to the foliage of the treated plants. The severity of the injury was determined 10 to 15 days after treatment and was rated on the scale of from 0 to 10 as follows: 0=no injury, 1, 2=slight injury, 3, 4=moderate injury, 5, 6=moderately severe injury, 7, 8, 9=severe injury and 10=death. The effectiveness of the compounds of this invention is demonstrated by the data in Table I.

TABLE I

| Weed species | Concentration of test compound (lbs./acre) | Injury rating |
|---|---|---|
| Barnyard grass | 4 | 10 |
|  | 2 | 10 |
|  | 1 | 8 |
| Coffee weed | 4 | 10 |
|  | 2 | 10 |
|  | 1 | 10 |
| Crabgrass | 4 | 10 |
|  | 2 | 8 |
|  | 1 | 7 |
| Curly dock | 4 | 10 |
|  | 2 | 9 |
|  | 1 | 9 |
| Downy brome | 4 | 9 |
|  | 2 | 9 |
|  | 1 | 9 |
| Foxtail | 4 | 9 |
|  | 2 | 8 |
|  | 1 | 8 |
| Johnson grass | 4 | 8 |
|  | 2 | 7 |
|  | 1 | 5 |
| Mustard | 4 | 10 |
|  | 2 | 10 |
|  | 1 | 10 |
| Velvet leaf | 4 | 10 |
|  | 1 | 6 |
| Bindweed | 4 | 9 |
|  | 2 | 8 |
|  | 1 | 7 |
| Matricaria | 4 | 10 |
|  | 2 | 10 |
|  | 1 | 10 |

We claim:
1. A compound of the formula

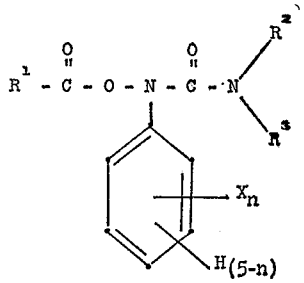

wherein $R^1$ is lower alkenyl; $R^2$ and $R^3$ are independently selected from the group consisting of hydrogen and lower alkyl; X is selected from the group consisting of lower alkyl, lower alkenyl, halogen, haloloweralkyl, lower alkoxy, nitro and diloweralkylamino; and $n$ is an integer from 0 to 5.

2. The compound of claim 1, 1-methacryloyloxy-1-(3', 4'-dichlorophenyl)-3-methylurea.

3. The compound of claim 1, 1-acryloyloxy-1-(2'-methylphenyl)-3-methylurea.

4. The compound of claim 1, 1 - crotonoyloxy-1-(3'-allylphenyl)-3,3-dimethylurea.

5. The compound of claim 1, 1-(3-butenoyloxy)-1-(4'-bromophenyl)-urea.

6. The compound of claim 1, 1 - (2-pentenoyloxy)-1-(4'-nitrophenyl)-3-isopropylurea.

References Cited

UNITED STATES PATENTS 3,219,428  11/1965  Weil et al. _____ 71—2.6

FOREIGN PATENTS 182,729  6/1966  U.S.S.R. _____ 260—545

LEWIS GOTTS, Primary Examiner

R. GERSTL, Assistant Examiner

U.S. Cl. X.R.

71—113, 120; 260—500, 511